United States Patent
Severinsson et al.

(10) Patent No.: US 6,766,885 B2
(45) Date of Patent: Jul. 27, 2004

(54) BRAKE MECHANISM (75) Inventors: Lars Severinsson, Hishult (SE); Ake Nelander, Bunkeflostrand (SE); Joakim Gripemark, Helsingborg (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 10/262,704

(22) Filed: Oct. 2, 2002

(65) Prior Publication Data
US 2003/0085082 A1 May 8, 2003

Related U.S. Application Data (63) Continuation of application No. PCT/SE01/00660, filed on Mar. 27, 2001.

(30) Foreign Application Priority Data

Apr. 3, 2000 (SE) .............................................. 0001182

(51) Int. Cl.[7] .............................................. F16D 55/02
(52) U.S. Cl. ...................................... 188/71.9; 188/72.9
(58) Field of Search .............................. 188/71.1, 71.7, 188/71.9, 72.9, 72.1, 73.34, 79.55, 79.56, 72.8, 71.6, 72.7

(56) References Cited

U.S. PATENT DOCUMENTS

| | | | | | |
|---|---|---|---|---|---|
| 4,399,894 A | * | 8/1983 | Tribe | ........................ | 188/71.9 |
| 4,635,761 A | * | 1/1987 | Smith et al. | ................ | 188/72.6 |
| 4,697,671 A | * | 10/1987 | Stewart et al. | ............. | 188/72.9 |
| 5,400,875 A | * | 3/1995 | Anthony et al. | ........... | 188/72.9 |
| 5,433,301 A | * | 7/1995 | Eshghy | ................... | 188/250 G |
| 5,439,078 A | * | 8/1995 | Baumgartner et al. | ... | 188/73.45 |
| 5,449,052 A | * | 9/1995 | Macke et al. | .............. | 188/71.9 |
| 5,664,646 A | * | 9/1997 | Bejot et al. | ................ | 188/71.9 |
| 5,833,035 A | * | 11/1998 | Severinsson | ............... | 188/72.7 |
| 6,053,289 A | * | 4/2000 | Bauer et al. | ............... | 188/71.9 |
| 6,269,914 B1 | * | 8/2001 | Angerfors | .................. | 188/71.9 |
| 6,325,182 B1 | * | 12/2001 | Yamaguchi et al. | ....... | 188/72.8 |

FOREIGN PATENT DOCUMENTS

DE 4212352 * 10/1993

* cited by examiner

Primary Examiner—Robert A. Siconolfi
Assistant Examiner—Devon Kramer
(74) Attorney, Agent, or Firm—St. Onge Steward Johnston & Reens LLC (57) ABSTRACT

The brake mechanism for a disc brake is received in a caliper by means of pivots. The brake mechanism comprises a lever, a cross bar, a thrust yoke and an adjuster mechanism. The thrust yoke is provided with braces going diagonally from the center of the thrust yoke down to the backside of the thrust plate. The structure of the thrust yoke ensures that the force is applied in distinct, separated areas of the brake pads. The brake mechanism is held together as one unit which facilitates handling and assembly.

14 Claims, 8 Drawing Sheets

BRAKE MECHANISM

This application is a continuation of pending International Application No. PCT/SE01/00660 filed Mar. 27, 2001 which designates the United States and claims priority from Swedish Application No. 0001182-5 filed Apr. 3, 2000.

FIELD OF THE INVENTION

The present invention concerns a mechanism for a disc brake according to the preamble of claim 1. The function of the brake mechanism is to transfer the braking movement and to amplify the force from a braking cylinder to a disc brake pad and to adjust the running clearance between brake pad and disc. The disc brake mechanism is to be placed in a disc brake caliper and consists of a thrust yoke, a cross bar, an adjuster means and a lever. The thrust yoke is connected to a brake pad holder provided with a brake pad for braking engagement with a brake disc, and the thrust yoke is axially movable in the caliper. The function of the lever is to transmit a braking force from a brake cylinder, attached to the caliper, to the cross bar. From the cross bar the braking force is transmitted to the thrust yoke.

A brake mechanism of this kind is primarily intended for a disc brake for a road vehicle but may be used for rail vehicles as well. The brake mechanism of the invention is developed for all kinds of heavy vehicles.

Today it is common to use either one or two thrust plates acting on the brake pad. The use of one thrust plate means reduced costs and less required space. Two thrust plates are used to get a better distribution of the forces acting on the brake pad. By having two thrust plates the risk of skewing and uneven wear is reduced. In the present invention the low costs of a single thrust plate is combined with the stability of two thrust plates.

One object of the present invention is to provide a mechanism having fewer parts giving reduced weight and lower costs. The mechanism must yet be powerful enough to withstand the expected strains and stresses.

A further object of the present invention is to hold the disc brake mechanism together as a unit in order to facilitate handling and assembly in the disc brake caliper.

Still a further object is that forces acting on the brake pad should be evenly distributed in order to avoid uneven wear of the brake pad.

The above objects are fulfilled by a brake mechanism according to the characterizing part of claim 1.

BRIEF DESCRIPTION OF DRAWINGS

Further objects and advantages of the invention will be obvious for a person skilled in the art from the detailed description below, with reference to the enclosed drawings, in which.

DETAILED DESCRIPTION OF DRAWINGS

Figure 1:
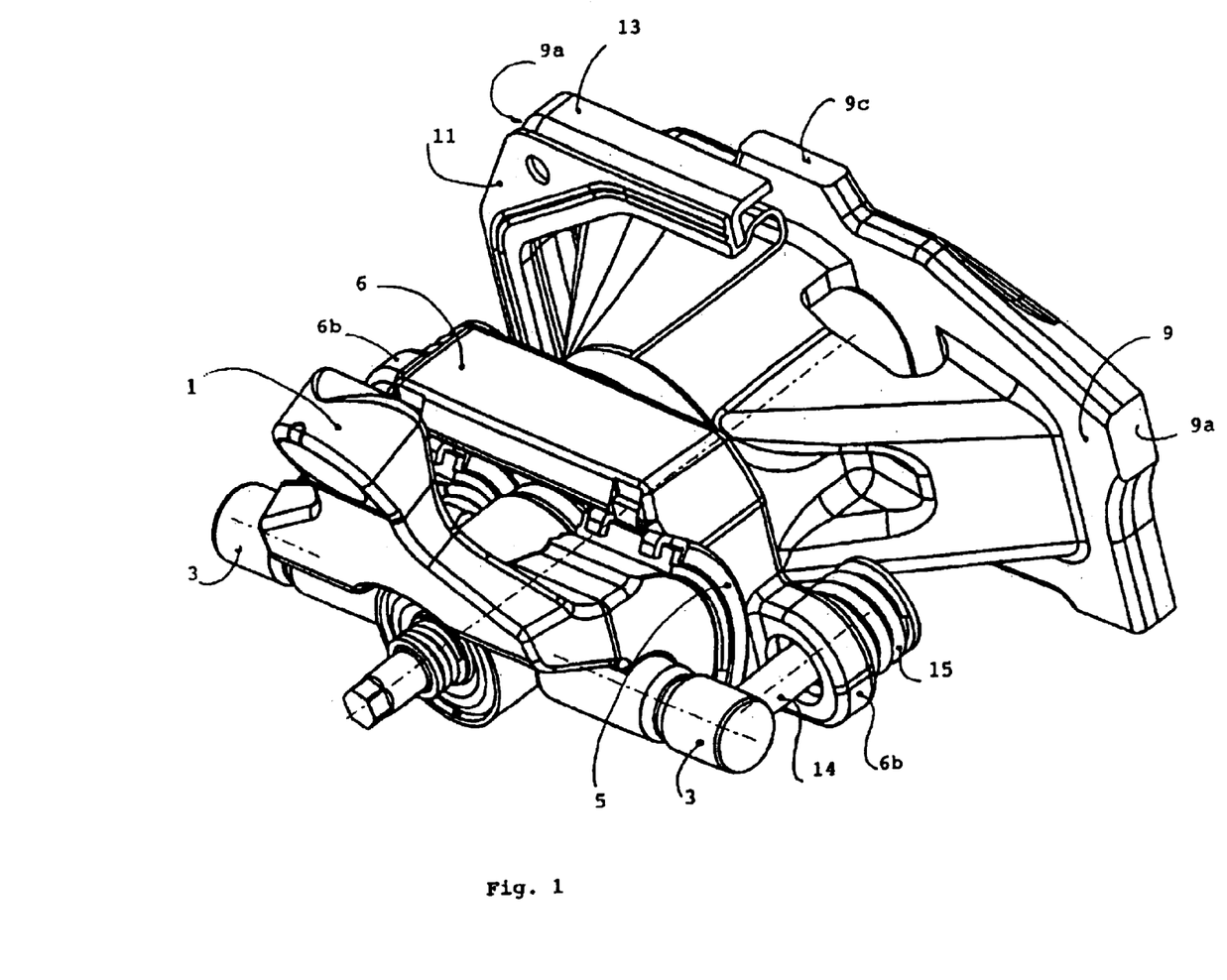
FIG. 1 is a perspective view, partly cut away, of a brake mechanism according to the invention.
Figure 3:
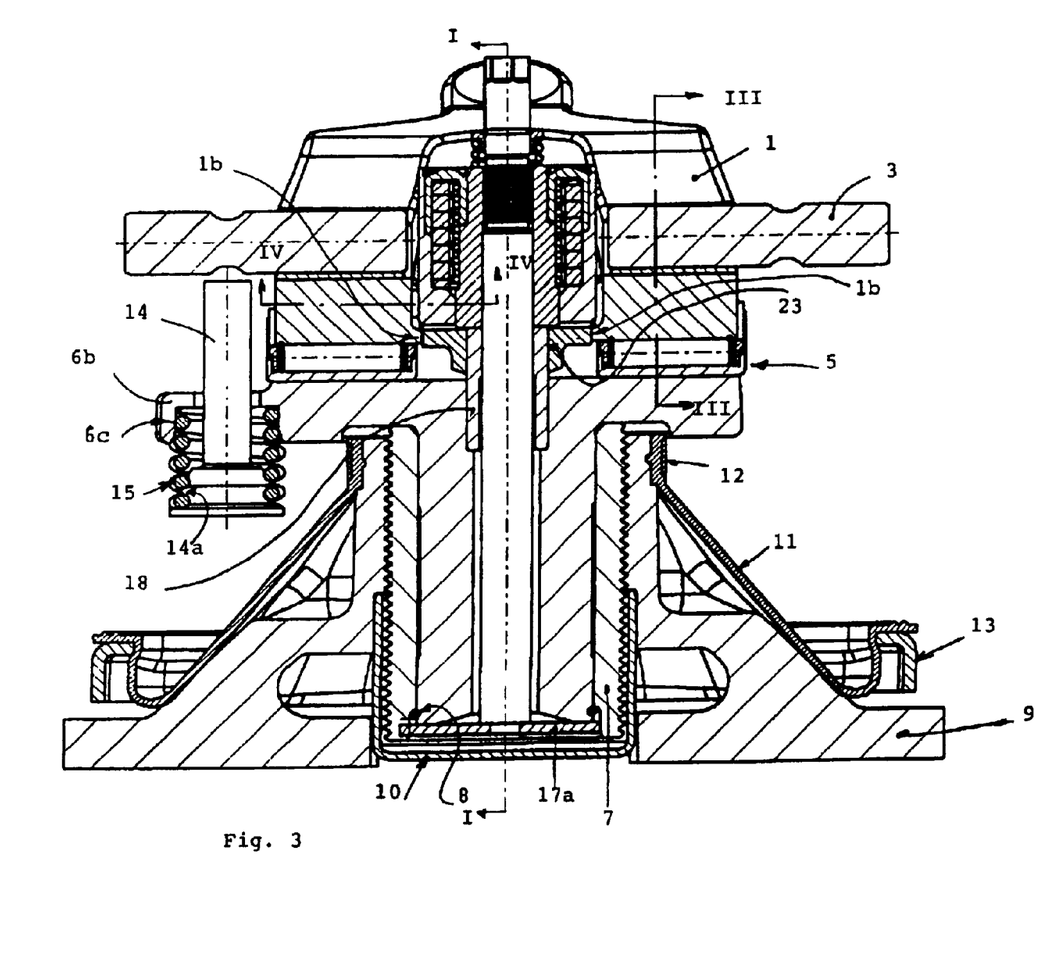
FIG. 3 is a sectional view taken along the line II—II of FIG. 2.
Figure 4:
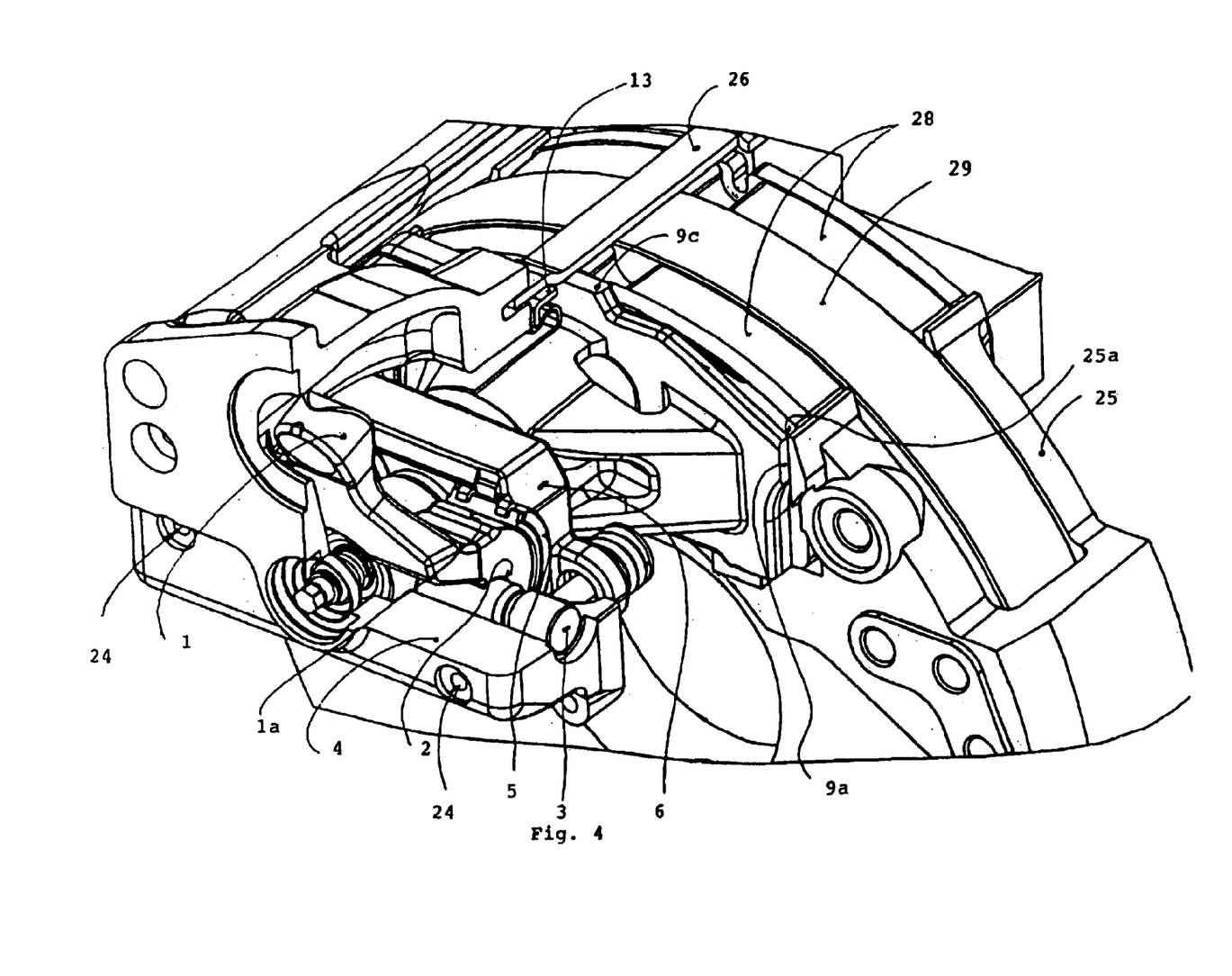
FIG. 4 is a perspective view, partly cut away, of a caliper enclosing the mechanism of FIG. 1, FIGS. 5 and 6 are views in section taken along the lines III—III and IV—IV, respectively, of FIG. 3, FIGS. 7 and 8 are perspective views of a first embodiment for a thrust yoke of the brake mechanism according to the invention.
Figure 5:
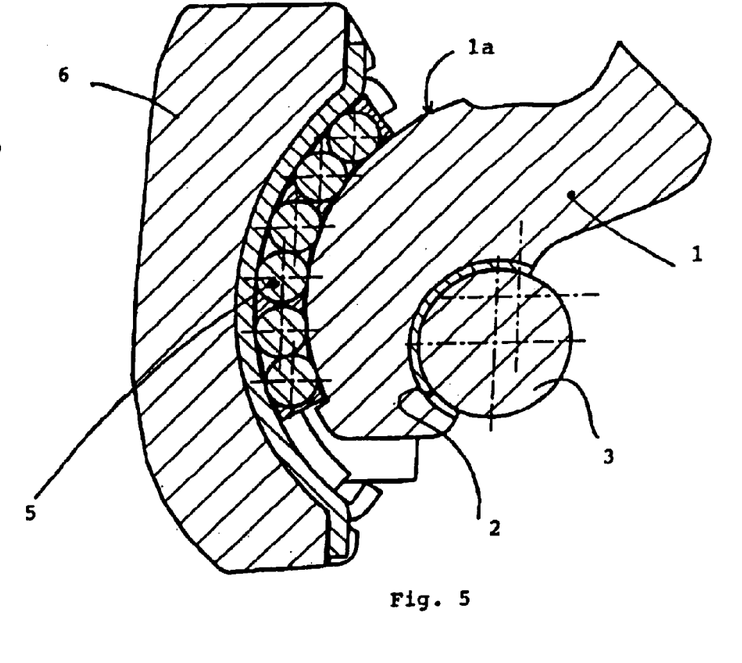

In FIG. 4 a disc brake caliper 4 is shown enclosing a brake mechanism according to the invention. The brake caliper may have any known structure. The brake mechanism as such is shown in FIG. 1. In the FIGS. 2, 3 and 5 to 11 different sections and parts of the brake mechanism are shown.

The brake mechanism is fixed to the caliper 4 by means of pivots 3. The pivots 3 are force fitted in the caliper 4.

The brake mechanism comprises a lever 1,31 supported on one side in the caliper 4. The lever 1,31 acts on a cross bar 6,33. The cross bar 6,33 is connected to a thrust yoke 9,34 by means of a screw 7. The brake mechanism further encloses an adjuster mechanism 16.

Figure 9:
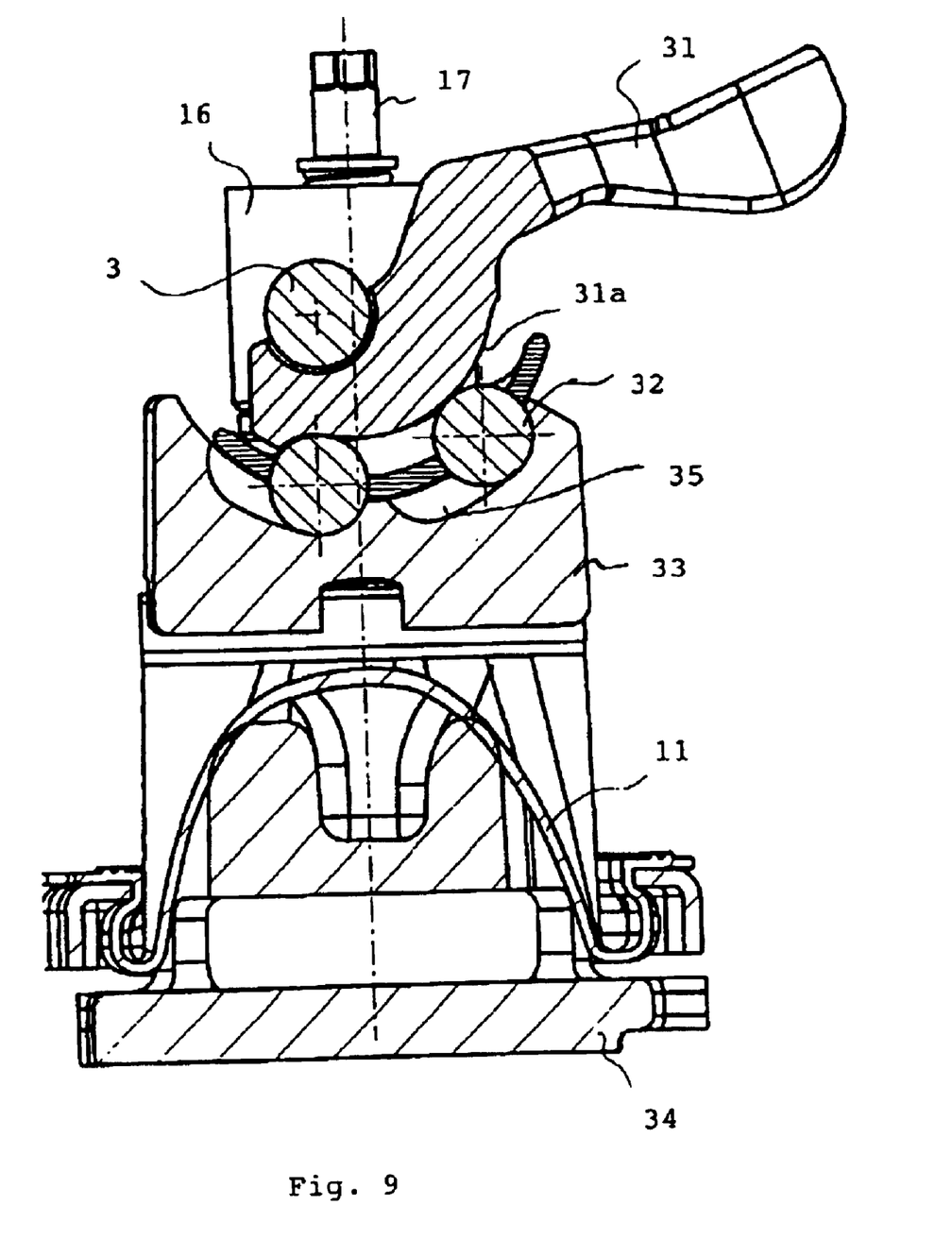
FIG. 9 is a sectional view showing a further embodiment for the support of the lever of the brake mechanism.
Figures 10, 11:
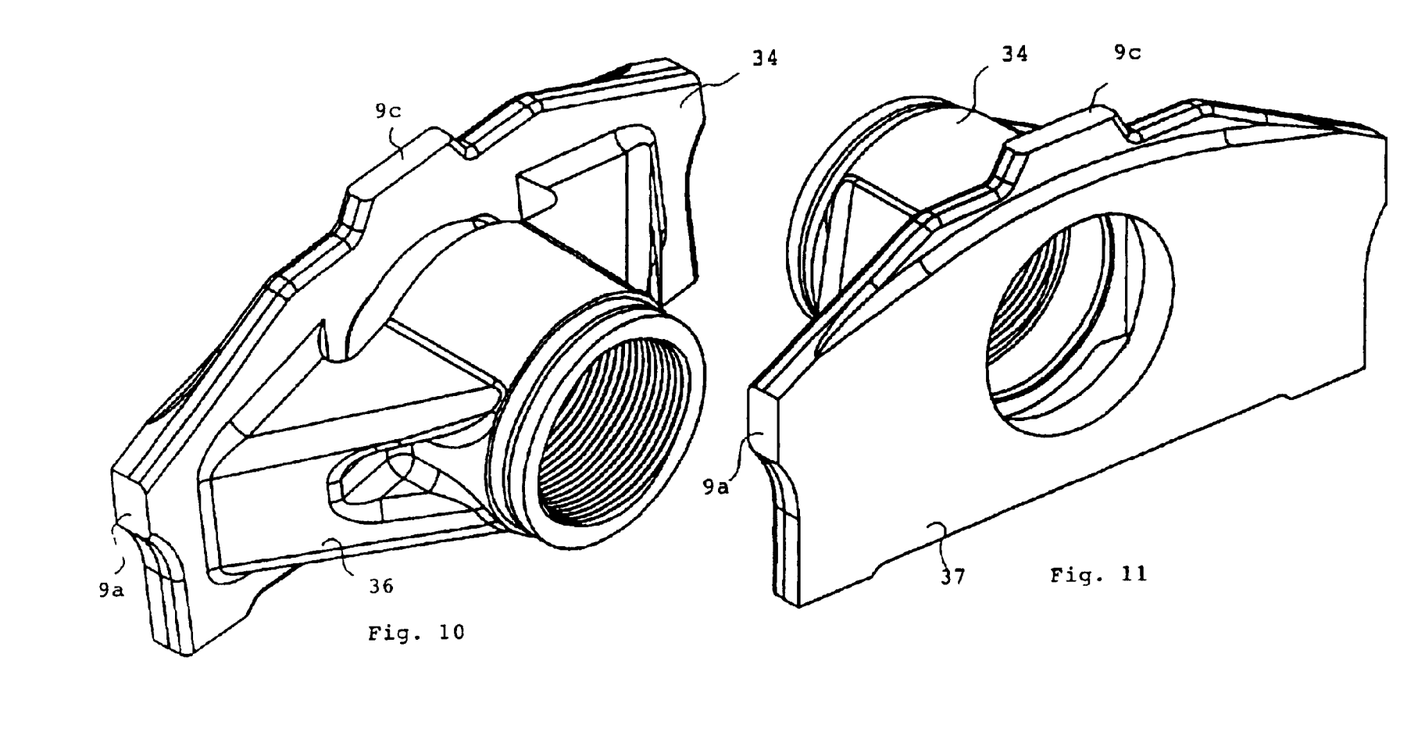
FIGS. 10 and 11 are perspective views of a second embodiment for a thrust yoke of the brake mechanism according to the invention.

The lever 1,31 is in normal way actuated by a brake cylinder (not shown) which preferably may be pneumatically actuated. The lever may have many different forms of which only two examples are shown in the figures. The lever consists in essence of an arm extending out from what could be called two curved wedges. The two wedges form a U-shape straddling the adjuster mechanism. Each wedge has surfaces in engagement with corresponding surfaces of the cross bar 6,33 and the pivots 3. Each of these pivots 3 is fixed to the caliper 4. The inner cylindrical surfaces of the lever 1,31 are received on the pivots 3 by means of slide bearings 2. The outer cylindrical surfaces 1a of the first embodiment of the lever 1 abut the cross bar 6 by means of needle bearings 5. In another embodiment the lever 31 has an outer surface 31a having an optional non-circular shape co-operating with rollers 32 arranged in two recesses 35 of the cross bar 33. In FIG. 9 the lever 31 according to the second embodiment is shown in the starting position, i.e. before activation of the brake. In the starting position the rollers 32 are at one end of the recesses 35 and during the movement of the lever 31 the rollers 32 will move to the other ends of the recesses 35 corresponding to the maximal extent of the movement of the lever 31. Thus, it is possible to vary the shape of the curve surface 31a of the lever 31 in contact with the rollers 32. This may be done to vary the force given by the brake mechanism to the brake pads.

The lever 1,31 has guiding faces 1b co-operating with a guide ring 23 rotatably received on a bushing 18 mounted in the cross bar 6,33. The guiding faces 1b protrude inwards from the inner sides of the U-shaped part of the lever straddling the adjuster mechanism 16.

The cross bar 6,33 is furnished with a guide 6a receiving the screw 7 on the outside. The screw 7 is locked by a clamp ring 8 in axial direction. The guide 6a protrudes downwards (as seen in FIG. 3) from the cross bar 6,33. The cross bar 6,33 is furnished with spring eyes 6b having apertures 6c for receiving return springs 15. The return springs 15 are mounted biased in a radial direction. A spring support 14 is mounted biased in a radial direction inside each return spring 15. The spring supports 14 have a pin part going through the spring eyes 6b and a lower stepped part for holding the lower part of each return spring 15. The return springs 15 abut surfaces 14a of the stepped part of the spring supports 14. The spring supports 14 are fixed in the caliper 4, e.g. by screws inserted in apertures 24, and the return springs 15 act between the spring eyes 6b and the spring supports 14. The spring eyes 6b have a stepped aperture with a smaller inner diameter for receiving the spring support 14 with a clearance and a larger inner diameter for receiving the return spring 15. The spring eyes 6b are arranged at diagonally opposing corners of the cross bar 6,33. The spring eyes 6b are arranged symmetrically in other embodiments (not shown).

The cross bar 6,33 has a central through aperture receiving an adjuster shaft 17. The adjuster shaft 17 furnished with a carrier 17a is supported in the guide 6a of the cross bar 6,33 through a bushing 18 mounted in the cross bar 6,33 by a force fit. The carrier 17a has a protruding part 17b co-operating with an axial groove 7b of the screw 7. The groove 7b and the protruding part 17b form an axially displaceable rotary connection between the adjuster shaft 17 and the screw 7. This is done by means of splines or any other arrangement giving an axially displaceable rotary connection.

The adjuster shaft 17 co-operates with an adjuster mechanism 16 (previously known) furnished with internal splines 16a in mesh with external splines 17c of the adjuster shaft 17. The adjuster mechanism 16 controls the adjuster shaft 17. The adjuster mechanism is on one side axially fixed by means of a spring 21, a washer 20 and a clamp ring 19 to the adjuster shaft 17. The clamp ring 19 is placed in a clamp ring groove 17e in the adjuster shaft 17. The spring 21 generates a tensional force in the adjuster shaft 17 which force is taken up in the boundary 6d between the carrier 17a and the guide 6a of the cross bar 6,33. The frictional force generated at the boundary is essential for the control function of the mechanism. On the opposite side the adjuster mechanism 16 abuts a bushing 18, received in the centre of the cross bar 6,33.

In order to make it possible to make a manual setting of the adjuster mechanism 16 the adjuster shaft 17 is furnished with an external hexagon head 17d.

Adjuster mechanisms are previously known, see for example the applicant's Swedish Patent No. 505 339. The adjuster mechanism is only one example and a person skilled in the art realises that the adjuster means may be varied and modified in several different ways. The adjuster mechanism 16 is used to compensate for the wear of the brake pad 28 by controlling the distance between the brake pad 28 and the brake disc 29. The brake pad 28 is placed in a carrier 25. The thrust yoke 9 supports the carrier 25.

In order to guide the lever 1,31 in a horizontal direction (as in FIG. 3) a guide ring 23 is mounted on the bushing 18. The guide ring 23 rolls against the guiding faces 1b of the lever 1,31 when the lever 1, 31 moves. The distance between the guiding faces 1b is smaller than the outer diameter of the adjuster mechanism 16. This means that the lever 1, 31 is fixed to the brake mechanism when the brake mechanism is handled outside the caliper 4 and during assembly in the caliper 4. Thus, the brake mechanism forms a self-sustained unit.

The thrust yoke 9,34 comprises a thrust plate, a central aperture and two braces 30,36. The central aperture is furnished with a thread for receiving the screw 7. The thrust yoke 9,34 furnished with a protective header 10, a bellows 11 and a bellows clamp 12 co-operates with the screw 7 by means of a screw thread 7a. The guide 6b of the cross bar 6 is received in the central aperture of the thrust yoke 9,34 via the screw 7.

Figure 7:
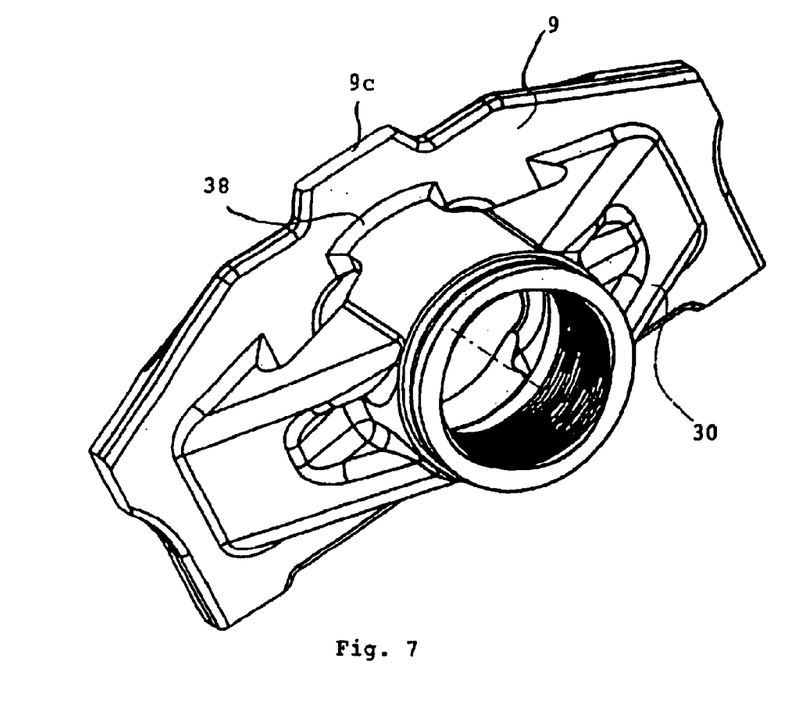
Figure 8:
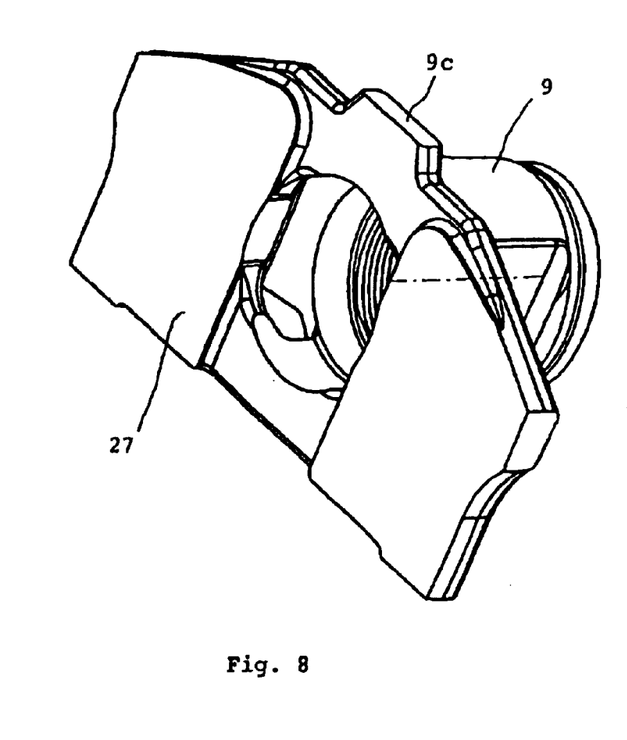

In a first embodiment the thrust yoke 9 has two raised portions 27 on the surface of the thrust plate facing the brake pad 28. The raised portions 27 are placed on alternative sides of the central aperture of the thrust yoke 9. The braces 30 of the thrust yoke 9 are diagonal and are provided opposite the centre of the raised portions 27. Expressed differently the braces 30 extend from the area of the raised portions 27 and backward towards the top of the screw 7. Furthermore, supports 38 are provided at the backside of the thrust plate on opposing sides of the central aperture. This means that the thrust plate will press on the brake pads 28 in the areas for the braces 30 in braking. Thus, the force will be distributed evenly on the brake pads 28. A person skilled in the art will realise that the number and form of the raised portions may be varied.

The second embodiment of the thrust yoke 34 (FIGS. 10 and 11) differs from the first embodiment in that the thrust plate 37 is in one part having only a central aperture. Furthermore, the thrust yoke 34 of the embodiment has no supports on the sides of the central aperture. This means that the thrust yoke will only press on the brake pads in two distinct separated areas.

The purpose of the structure and design of the thrust yoke 9, 34 is to distribute the pressure on the brake pads 28 and prevent that the brake pads 28 will get an uneven wear.

During assembly of the brake mechanism in the caliper 4 the spring supports 14 are fixed to the caliper 4 by screws in apertures 24. This will bias the return springs 15. The pivots 3 have grooves receiving a part of the stem of the screw, which will lock the bearing shafts in place in the caliper 4. The springs 15 function both as return springs for the mechanism and for a resilient centring of the mechanism (in the longitudinal direction of the pivots 3). The end faces 9a of the thrust yoke 9,34 form an absolute stop against the pad holder after a predetermined motion in this direction. A pad yoke 26 is placed in the caliper 4 in contact with an abutting surface 9c on a protruding part of the plate of the thrust yoke 9,34. Springs (not shown) are provided between the pad yoke 26 and the upper sides of the brake pads 28 in order to hold the brake pads 28 in place. Thus, the thrust yoke 9,34 guides the mechanism in both the radial and tangential directions of the brake disc.

The bellows 11 is fixed at the caliper 4 by means of a bellows support 13 (the fixing screw is not shown). The bellows 11 is rolled out and in as the thrust yoke is moving outwardly and inwardly, respectively.

The bellows 11 and the protective header 10 protect the brake mechanism from the hostile environment in which the brake operates. The bellows 11 is placed in a protective position behind the thrust yoke 9,34. The bellows 11 surrounds the thrust yoke 9,34.

Figure 6:
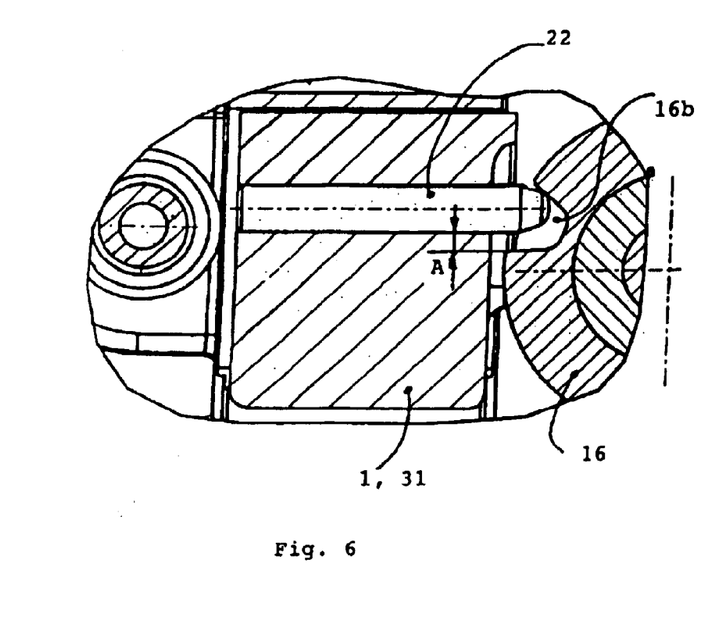

FIG. 6 shows the adjuster mechanism 16 being activated by the lever 1, 31. The tip 22c of a stud 22 of the lever is received in a groove 16b of the housing of the adjuster mechanism 16. FIG. 6 is taken in a position were the brake is not applied. When the brake is applied the stud 22, which is fixed in the lever 1,31, will go downwards as seen in the figure. When the distance A has been traversed the housing of the adjuster mechanism 16 is forced to rotate anti-clockwise. The distance A determines the clearance between the break pad 28 and the brake disc 29 when the brake is not activated.

Figure 2:
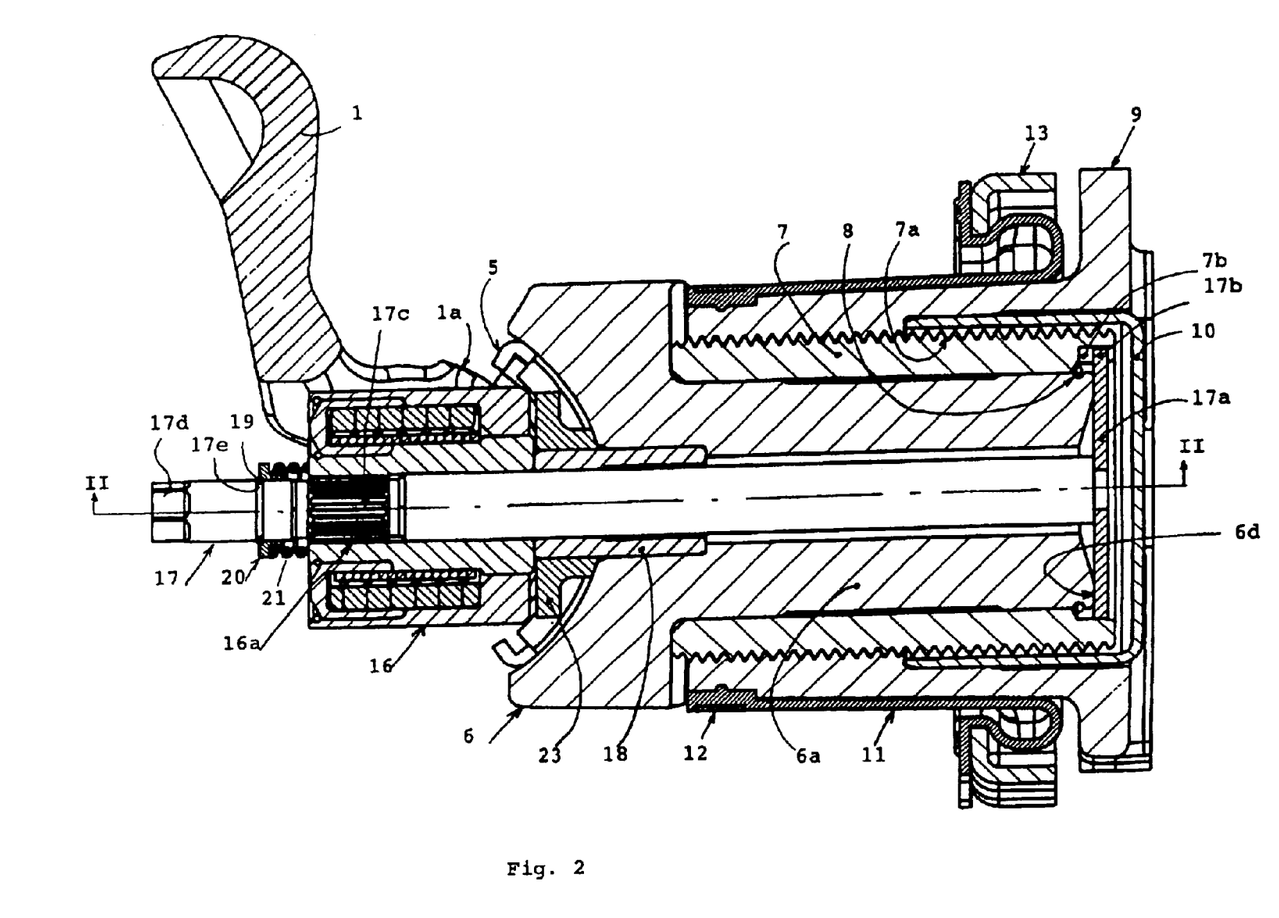
FIG. 2 is a sectional view of the brake mechanism of FIG. 1 taken along the line I—I of FIG. 3.

During an application stroke, i.e. when the lever is moved to the right in FIG. 2 and the curved wedge is pushing the cross bar 6 (and associated parts) to the right in FIG. 2, the control distance or A-measure A will first be traversed. The movement of the lever 1, 31 is a rotary motion. At the continued application stroke the stud 22 will rotate the housing of the adjuster mechanism 16. This rotation will be transferred to the adjuster shaft 17, which rotates the screw 7. This will decrease the slack, if the slack between the brake pad 28 and the brake disc 29 is excessive in relation to the set control distance, until a counter-force and thus a torque is built up when brake pad 28 engages the brake disc 29. The force transmission during adjustment occurs by means of a one-way spring drivingly acting between a driving ring and an adjuster hub of the known adjuster mechanism 16. When the brake pad 28 is in engagement with the brake disc 29, the torque is such that slip will occur between the housing and the one-way spring inside the adjuster mechanism 16.

During the release stroke no torque is transmitted by the one-way spring. The slack between the brake pad 28 and the brake disc 29 is taken up by rotation of the screw 7 in relation to the cross bar 6,33, the new relative position will be maintained during the release stroke. The slack will be taken up in small steps each time the brake is activated.

In braking the lever 1,31 will act on the cross bar 6,33. The cross bar 6,33 will act on the thrust yoke 9,34 by means of the screw 7, when the adjuster mechanism 16 has taken up a possible slack. After having traversed a short distance, i.e. the control distance A or the A-measure, the thrust yoke 9,34 will act on the brake pad 28 in two distinct areas, corresponding to the position of the diagonal braces 30,36 on the backside of the thrust plate. The brake pads 28 are received in carriers 25 with a clearance between the outer edge of the brake pad 28 and the carrier 25. This means that when the brake pad 28 hits the brake disc 29 it will go a short distance in the rotational direction of the disc 29 before it is stopped by hitting a face 25a of the carrier 25. This movement of the pad 28 is transferred as a lateral movement to the thrust yoke 9,34. This lateral movement is taken up by the return springs 15 biased in radial direction in the apertures 6c of the cross bar 6,33. When the brake pad 28 is released from the brake disc 29 the return springs 15 will bring back the brake mechanism to a centred position.

A person skilled in the art realises that different levers 1, 31 may be combined with different thrust yokes 9,34 without departing from the invention.

What is claimed is:

1. A disc brake mechanism for transmitting a brake force from a brake cylinder to brake pads via a lever, a cross bar and a thrust yoke, which is connected to a brake pad carrier, characterized in that the thrust yoke has a central aperture receiving a screw, in which a guide of the cross bar is received, and has braces that go diagonally from the area of the aperture downward and outward to the backside of a plate of the thrust yoke for distribution of the brake force on the brake pads.

2. The disc brake mechanism of claim 1, characterized in that the thrust yoke is provided with one or more raised portions on the surface facing a brake pad support and that the braces go inclined from the area of the raised portions towards a guide of the cross bar.

3. The disc brake mechanism of claim 2, characterized in that the thrust yoke has two raised portions placed on alternate sides of the centre of the surface of the thrust yoke facing the brake pad.

4. The disc brake mechanism of claim 1, characterized in that the lever has an outer surface of a non-circular shape, which surface abuts two rollers contained between the lever and the cross bar and that the rollers are received in one or two recesses of the cross bar.

5. The disc brake mechanism of claim 1, characterized in that an adjuster mechanism is attached to a splined shaft, which shaft is received in the centre of a guide of the cross bar.

6. The disc brake mechanism of claim 5, characterized in that the adjuster mechanism is attached to an adjuster shaft by means of a bushing; that a guide ring is mounted on the bushing in order to guide the lever in horizontal direction; and that the lever has guiding faces in rolling contact with the guide ring.

7. The disc brake mechanism of claim 6, characterized in that the distance between the guiding faces of the lever is less than the outer diameter of the adjuster mechanism.

8. The disc brake mechanism of claim 1, characterized in that the thrust yoke is furnished with a protective header, a bellows and a bellows clamp and that the bellows surrounds the thrust yoke.

9. The disc brake mechanism of claim 1, characterized in that the cross bar has two apertures at diagonally opposite corners for receiving spring supports.

10. The disc brake mechanism of claim 9, characterized in that the inner diameter of the apertures of the cross bar is greater than the outer diameter of the spring supports; that return springs are received on the spring supports; and that the springs are biased in a radial direction by means of a surface of the spring supports.

11. A disc brake mechanism for transmitting a brake force from a brake cylinder to brake pads via a lever, a cross bar and a thrust yoke, which is connected to a brake pad carrier, characterized in that the thrust yoke has a central aperture and has braces that go diagonally from the area of the aperture downward and outward to the backside of a plate of the thrust yoke for distribution of the brake force on the brake pads and wherein the lever has an outer surface of a non-circular shape, which surface abuts two rollers contained between the lever and the cross bar and that the rollers are received in one or two recesses of the cross bar.

12. A disc brake mechanism for transmitting a brake force from a brake cylinder to brake pads via a lever, a cross bar and a thrust yoke, which is connected to a brake pad carrier, characterized in that the thrust yoke has braces for distribution of the brake force on the brake pads and an adjuster mechanism is attached to a splined shaft, which shaft is received in the centre of a guide of the cross bar and the adjuster mechanism is attached to an adjuster shaft by means of a bushing; that a guide ring is mounted on the bushing in order to guide the lever in horizontal direction; and that the lever has guiding faces in rolling contact with the guide ring.

13. The disc brake mechanism of claim 12, characterized in that the distance between the guiding faces of the lever is less than the outer diameter of the adjuster mechanism.

14. A disc brake mechanism for transmitting a brake force from a brake cylinder to brake pads via a lever, a cross bar and a thrust yoke, which is connected to a brake pad carrier, characterized in that the thrust yoke has a central aperture and has braces that go diagonally from the area of the aperture downward and outward to the backside of a plate of the thrust yoke for distribution of the brake force on the brake pads and that the thrust yoke is furnished with a protective header, a bellows and a bellows clamp and that the bellows surrounds the thrust yoke.

* * * * *